(12) United States Patent
Hatton et al.

(10) Patent No.: US 8,694,558 B2
(45) Date of Patent: Apr. 8, 2014

(54) METHODS AND SYSTEMS FOR TRACKING WORK IN A MULTI-TENANT DATABASE ENVIRONMENT

(75) Inventors: James Hatton, Odessa, FL (US); Analia Mastrogiovanni, Tampa, FL (US); Alexis Williams, Odessa, FL (US)

(73) Assignee: salesforce.com, inc., San Francisco, CA (US)

( * ) Notice: Subject to any disclaimer, the term of this patent is extended or adjusted under 35 U.S.C. 154(b) by 202 days.

(21) Appl. No.: 12/946,847

(22) Filed: Nov. 15, 2010

(65) Prior Publication Data

US 2011/0295905 A1    Dec. 1, 2011

Related U.S. Application Data

(60) Provisional application No. 61/349,713, filed on May 28, 2010.

(51) Int. Cl.
*G06F 17/30* (2006.01)

(52) U.S. Cl.
USPC ........................................................ 707/803

(58) Field of Classification Search
USPC ................................. 707/803; 717/100, 168
See application file for complete search history.

(56) References Cited

U.S. PATENT DOCUMENTS

| | | | |
|---|---|---|---|
| 5,075,847 A * | 12/1991 | Fromme ........................ | 717/136 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |

(Continued)

OTHER PUBLICATIONS

Banks et al, "Toward Cloud-based Collaboration Services", May 2009, Hewlett-Packard Labs, 5 pages, http://static.usenix.org/event/hotcloud09/tech/full_papers/banks.pdf.*

*Primary Examiner* — Cam-Linh Nguyen
(74) *Attorney, Agent, or Firm* — Ingrassia Fisher & Lorenz, P.C.

(57) ABSTRACT

A system and method for tracking work in a database environment. In one embodiment, a method includes generating a plurality of work records, where each work record is associated with code that is submitted for integration into a software application. The method further includes receiving a first indication that designates a first work record of the plurality of work records as a parent work record, and receiving a second indication that designates a second work record of the plurality of work records as a child work record, where the second work record is a child of the first work record.

18 Claims, 7 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,407,753 B1 * | 6/2002 | Budinsky et al. ............. 715/764 |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,836,878 B1 * | 12/2004 | Cuomo et al. ................. 717/100 |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 7,954,094 B2 * | 5/2011 | Cascaval et al. ............. 717/145 |
| 7,996,723 B2 * | 8/2011 | Levine et al. ................. 714/38.1 |
| 8,032,397 B2 * | 10/2011 | Lawless .............................. 705/3 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,131,844 B2 * | 3/2012 | Moore et al. ................... 709/224 |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0044987 A1 * | 3/2004 | Kompalli et al. ............. 717/100 |
| 2004/0078780 A1 * | 4/2004 | Dutt et al. ...................... 717/106 |
| 2004/0078785 A1 * | 4/2004 | Dutt et al. ...................... 717/136 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0097515 A1 * | 5/2005 | Ribling ........................... 717/124 |
| 2006/0150182 A1 * | 7/2006 | Hughes et al. ................. 717/174 |
| 2007/0061782 A1 * | 3/2007 | Schreiner et al. ............. 717/124 |
| 2008/0005732 A1 * | 1/2008 | Coon ............................. 717/168 |
| 2010/0318974 A1 * | 12/2010 | Hrastnik et al. ............... 717/135 |
| 2011/0191752 A1 * | 8/2011 | Cleraux et al. ................ 717/129 |

\* cited by examiner

Change Lists

No records to display

Parent Work Records [New]

| Action | Work ID | Assignee | Subject | Type | Priority | Scheduled Build | Resolved | Closed |
|---|---|---|---|---|---|---|---|---|
| ⊕ | | | | | | | | |

No records to display. Click the plus icon to create a new record.

Child Work Records [New] [Expand All] [Show Open Only]
                                              ╲
                                               404

| Action | Work ID | Assignee | Subject | Type | Priority | Scheduled Build | Resolved | Closed |
|---|---|---|---|---|---|---|---|---|
| 🗑 | W-300532 ~ 208 | | test 967 | User Story | P1 | | ✗ | ✗ |
| 🗑 | W-300529 ~ 202 | | test 984 | User Story | P1 | | ✗ | ✗ |
| 🗑 | W-300530 ~ 204 | 502 | test 985 | User Story | P1 | | ✗ | ✗ |
| ⊕ | | | | | | | | |

1 of 3 of 3

62 Org Cases

No records to display

Work Subscribers

| Action | | Username | | Name | | |
|---|---|---|---|---|---|---|
| ⊕ | | | | | | |

No record to display. Click the plus icon to create a new record.

Release List

No records to display

METHODS AND SYSTEMS FOR TRACKING WORK IN A MULTI-TENANT DATABASE ENVIRONMENT

CLAIM OF PRIORITY

This application claims the benefit of U.S. Provisional Patent Application 61/349,713 entitled, "Methods and Systems for Tracking Work in a Multi-Tenant Database Environment," filed May 28, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which, in and of themselves, may also be inventions.

In conventional database systems, users access their data resources in one logical database. A user of such a conventional system typically retrieves data from and stores data on the system using the user's own systems. A user system might remotely access one of a plurality of server systems that might in turn access the database system. Software applications used to implement database systems are routinely modified to incorporate improvements. Unfortunately, conventional means for managing modifications to software applications can be time consuming and error prone, especially when there are numerous changes to a given software application.

BRIEF SUMMARY

Embodiments provide mechanisms and methods for tracking work in a database environment. In one embodiment, a method includes generating a plurality of work records, where each work record is associated with code that is submitted for integration into a software application. The method further includes receiving a first indication that designates a first work record of the plurality of work records as a parent work record, and receiving a second indication that designates a second work record of the plurality of work records as a child work record, where the second work record is a child of the first work record.

While one or more implementations and techniques are described, one or more embodiments may be implemented in a system having an application server providing a front end for an on-demand database service capable of supporting multiple tenants. The embodiments described herein are not limited to multi-tenant databases or deployment on application servers. Embodiments may be practiced using other database architectures, i.e., ORACLE®, DB2® by IBM and the like, without departing from the scope of the embodiments claimed.

Any of the above embodiments may be used alone or together with one another in any combination. Embodiments described herein may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the embodiments described are not limited to the examples depicted in the figures.

DETAILED DESCRIPTION

General Overview

Methods and systems are provided for tracking work in a multi-tenant database environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for tracking work in a multi-tenant database environment will be described with reference to example embodiments.

System Overview

Embodiments described herein facilitate and manage the tracking of work in a database environment such as an on-demand database services system. Such embodiments generate work records associated with code that is submitted for integration into a software application. Such code may include user stories, which include new functionality to be added to the software application. Such code may also include bug fixes. Embodiments described herein enable a user to designate a given work record (e.g., user story work record, bug fix work record, investigation work record, "to do" work record, etc.) as a parent to other work records, which are designated as children. A given parent work record may have multiple children, grandchildren, etc. A given child work record may have multiple parents, grandparents, etc. These relationships among work records enable users (e.g., developers, managers, etc.) to organize work records for tracking and/or for other purposes, such as viewing parent-child relationships (e.g., in a hierarchy, parent-child list, etc.).

Figure 1:
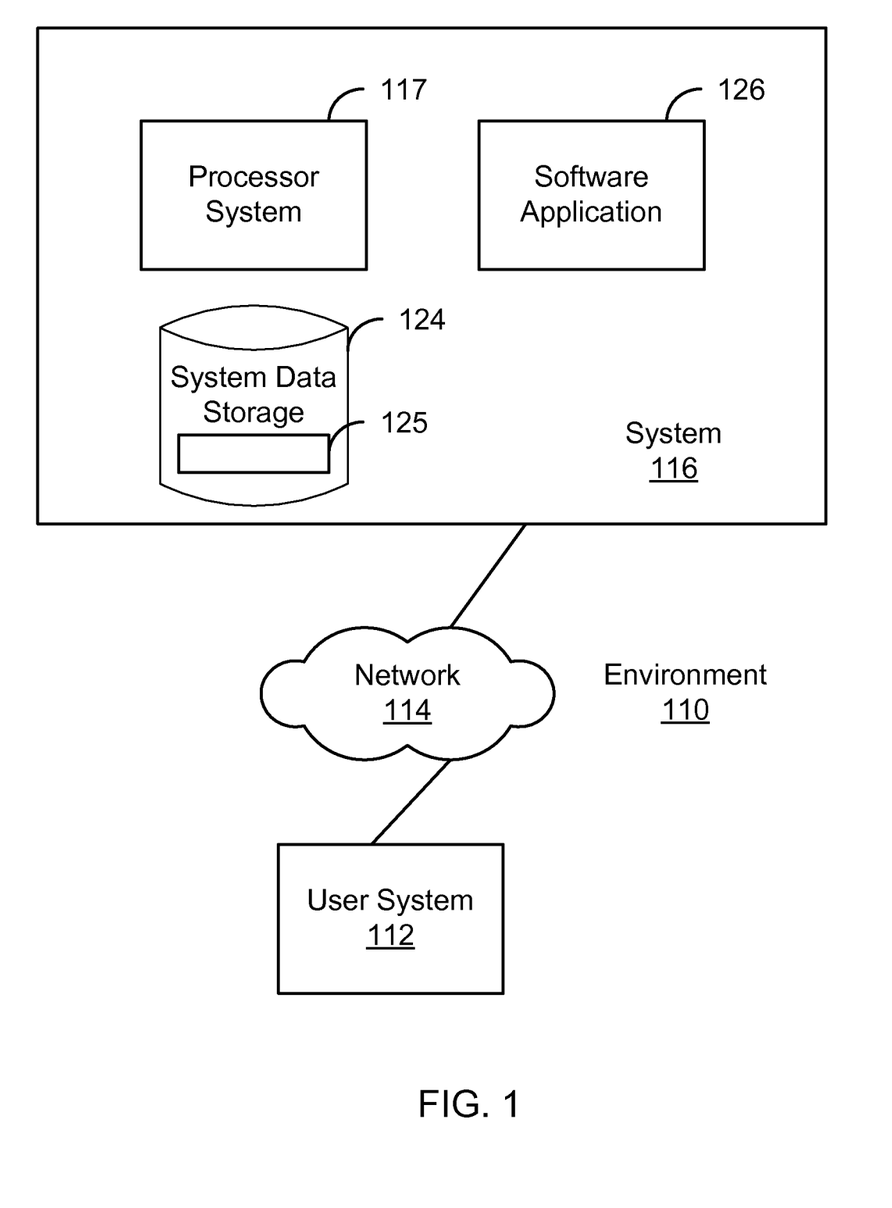
FIG. 1 illustrates a block diagram of an example environment, which may be used to implement the embodiments described herein.

FIG. 1 illustrates a block diagram of an example environment 110, which may be used to implement the embodiments described herein. Environment 110 may include user system 112, a network 114, a system 116, a processor system 117, a software application 126, system data storage 124 for storing system data 125. In other embodiments, environment 110 may not have all of the components listed and/or may have other elements instead of, or in addition to, those listed above.

For ease of illustration, FIG. 1 shows one block for each of user system 112, processor system 117, system data storage 124. These blocks 112, 117, and 124 may represent multiple user systems, processor systems, and system data storage units.

In one embodiment, system 116 is an on-demand database services system that implements a cloud platform. As described in more detail below, system 116 enables a user (e.g., via user system 112) to interact with a cloud platform to submit and track code to be integrated into a software application (e.g., software application 126). In one embodiment, the received code may be for a particular release of the software application (e.g., gus 2.17).

In one embodiment, system 116 may utilize a development tracking system built on the Salesforce.com platform using tools such as Visualforce and Apex. In one embodiment, system 116 enables, among other things, automated release stamping, templates, auto assignments, and tagging of data. System 116 also enables reporting, dashboards, and integration with other systems, such as support systems, QA systems, etc.

Figure 2:
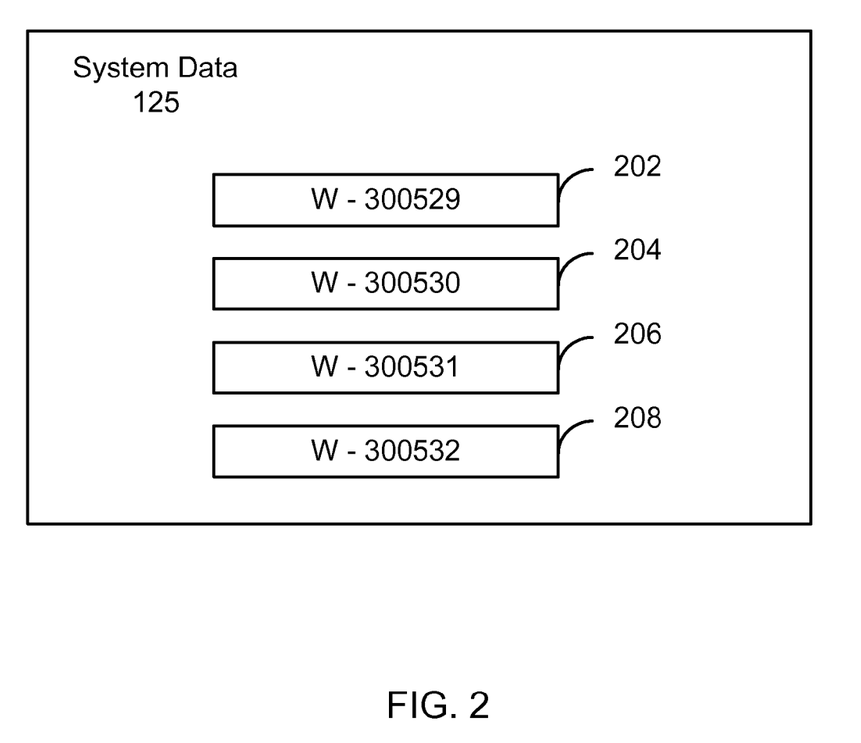
FIG. 2 illustrates an example simplified block diagram of system data, according to one embodiment.

FIG. 2 illustrates an example simplified block diagram of system data 125, according to one embodiment. System data 125 may be stored in system data storage 124, or may be stored in any suitable storage location. In one embodiment, system data 125 may include work records 202, 204, 206, and 208. In one embodiment, system 116 may generate unique identification labels for each work record to prevent duplicates and to ensure consistency. For example, as shown in FIG. 2, work records 202-208 are also labeled W-300529, W-300530, W-300531, and W-300532, respectively, which are alphanumeric labels generated by system 116 for identification purposes. System 116 may use any suitable naming convention to identify each work record. In one embodiment, system 116 does not allow the user to change these unique identification labels in order to prevent duplicates and ensure consistency.

For ease of illustration, only four work records are shown. System data 125 may include thousands of work records.

In one embodiment, each work record 202-208 may be associated with code to be integrated into the software application in order to provide changes to the software application. Such changes to the software application are tracked using change lists. In one embodiment, the code may be code for new functionality that is added to the software application, in which case the code may be referred to a "user story." An example of added functionality may be a special field that is used to store information for generating a report. A given work record (e.g., work record 206) may be designated as a user story.

In one embodiment, the code may be code that fixes a bug, in which case the code may be referred to as a "bug fix." In one embodiment, a bug may be a problem found within the software application. The problem may be associated with the original application, a user story, or even another bug fix. A given work record may be designated as a bug fix.

Figure 3:
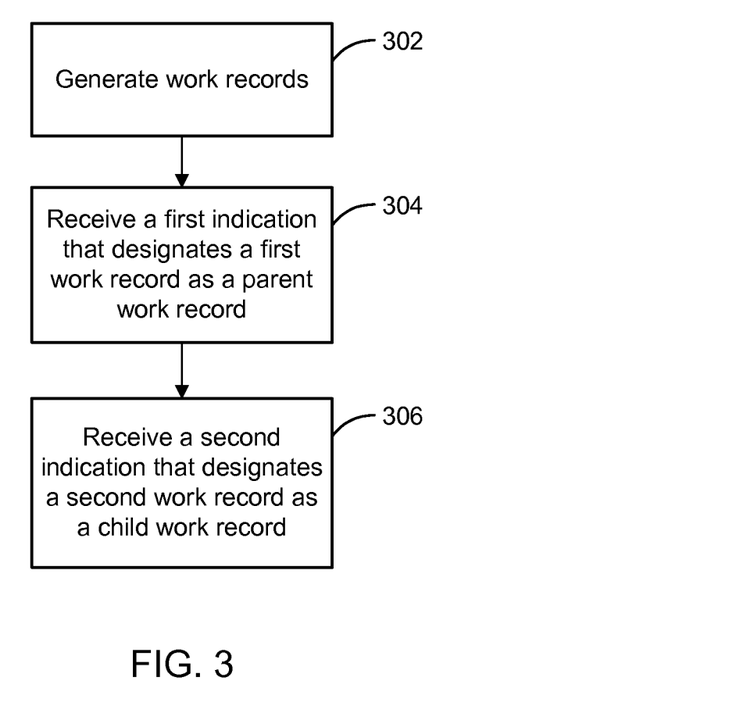
FIG. 3 illustrates an example simplified flow diagram for tracking work in a database environment, according to one embodiment.
Figure 6:
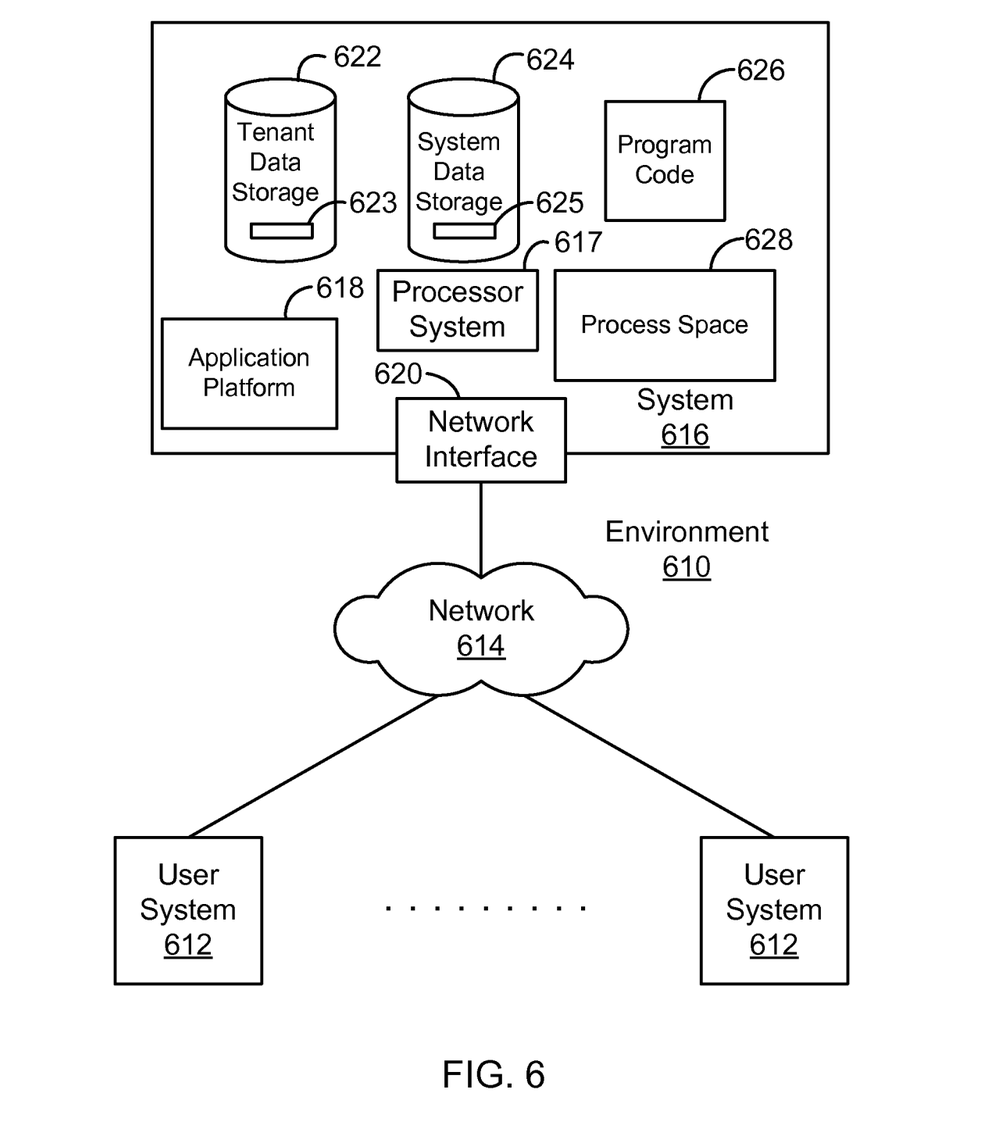
FIG. 6 illustrates a block diagram of an example environment where a database service might be used, and which may be used to implement the embodiments described herein.
Figure 7:
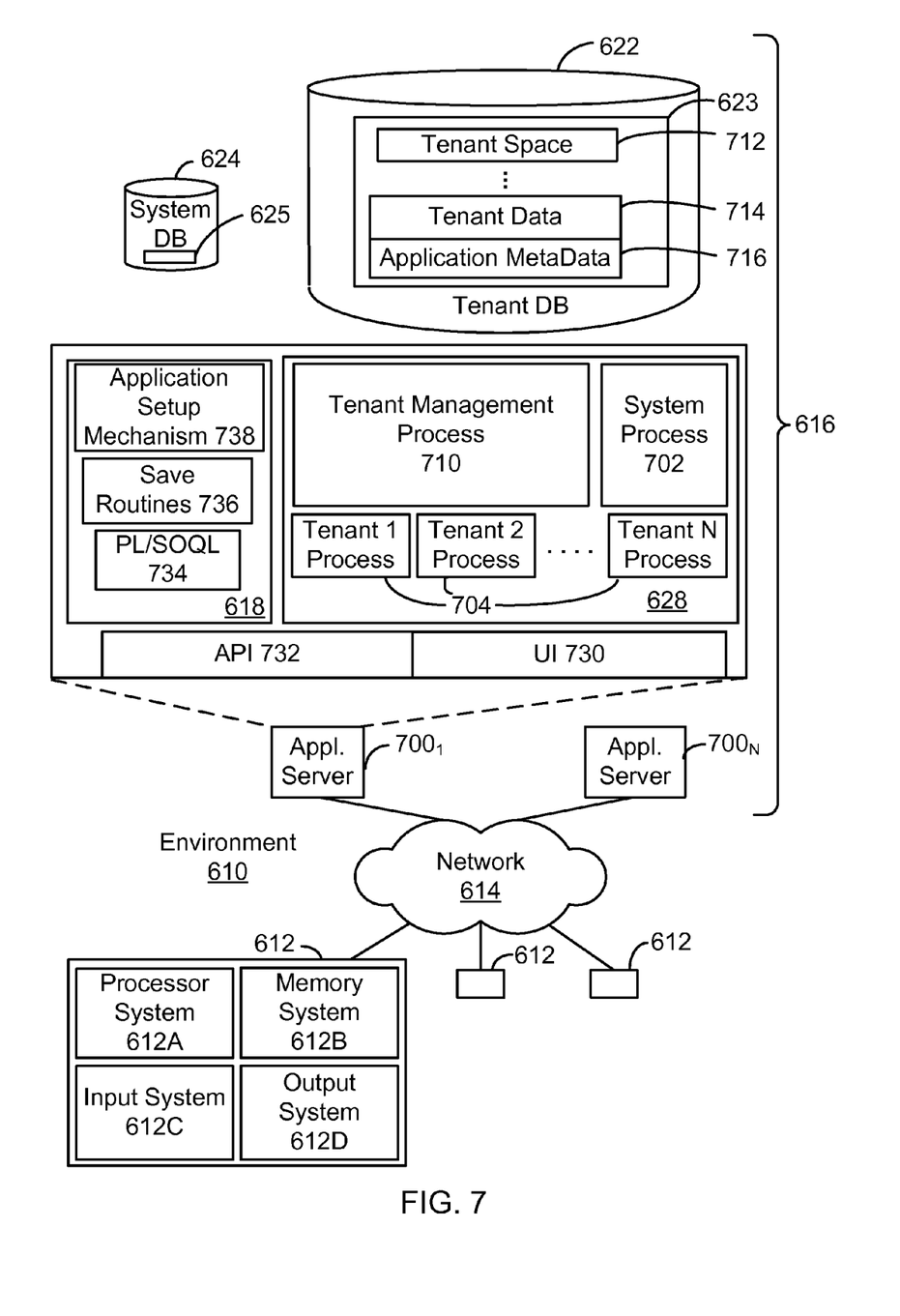
FIG. 7 illustrates a block diagram of another example environment, which may be used to implement the embodiments described herein.

FIG. 3 illustrates an example simplified flow diagram for tracking work in a database environment, according to one embodiment. Referring to FIGS. 1 to 3, the method is initiated in block 302, where system 116 generates work records 202-208, where each work record is associated with code that is submitted for integration into a software application. While system 116 of FIG. 1 is described as performing the steps in the embodiments described herein, any suitable component or combination of components of system 116 may perform the steps described. For example, the steps may be performed by processor system 117 or process space 628 of FIG. 6, by system process 702 of FIG. 7, or by any other suitable processor or processors associated with system 116. FIGS. 6 and 7 are described in detail below.

In one embodiment, system 116 may receive multiple builds of code for multiple changes to the application. Each work record 202-208 may apply to each submission of code by a given user. In one embodiment, the software application is implemented on the cloud platform of system 116.

In one embodiment, system 116 enters the information associated with the code into a work record (e.g., one of work records 202-208), which is created when system 116 receives a request for a user story or for a bug fix.

In one embodiment, a given user may be one or more people assigned to the code, which may include, for example, one or more developers who wrote the code, one or more release managers, one or more quality engineers, one or more technical writers adding documentation, etc. Note that the terms "submit" and "check in" are used interchangeably. Also, the terms "application," "software application," and "software package" are used interchangeably. In one embodiment, the user may input the code via an input system such as input system 112 of FIG. 1, or via any other suitable input system. In one embodiment, the submission of the code may be facilitated by an Agile system or by a source control system (e.g., system 116) interacting with the Agile system.

In one embodiment, a script is used to submit or check in the code. In one embodiment, the script used may be a perl script (e.g. "gus.pl"). Furthermore, in one embodiment, a check-in tool such as Perforce (P4) may be used to enable the user check in the code.

In block 304, system 116 receives a first indication that designates a first work record of the plurality of work records as a parent work record. In block 306, system 116 receives a second indication that designates a second work record of the plurality of work records as a child work record, where the first work record is a child of the second work record. Note that the terms "parent" and "parent work record" are used interchangeably. Also, the terms "child" and "child work record" are used interchangeably.

In one embodiment, assuming a first work record has been designated as parent and a second work record has been designated as a child, if a third work record is designated as a child of the second work record, system 116 automatically renders the third work record as a grandchild of the first work record.

While the example embodiments described herein are directed to user story and bug fix work records, it is to be understood that the implementations are not limited to these example embodiments. For example, with regard to adding parent or child work records to create a family of work records, users may add investigation work records, "to do" work records, etc. in addition to user story work records and bug fix work records. For example, in one embodiment, a user may create an investigation work record, which is a type of work record often used by customer support to open investigations on production issues. That user may create a bug or a user story from that investigation. In another example embodiment, a user may create "to do" work record, which is another type of work record often used to make notes or "to do" reminders. As such, a given family of work records may include a combination of different work record types, such as user story work records, bug fix work records, investigation work records, to do work records, etc. Such a family of work records may be created using the embodiments described herein.

Figure 4:
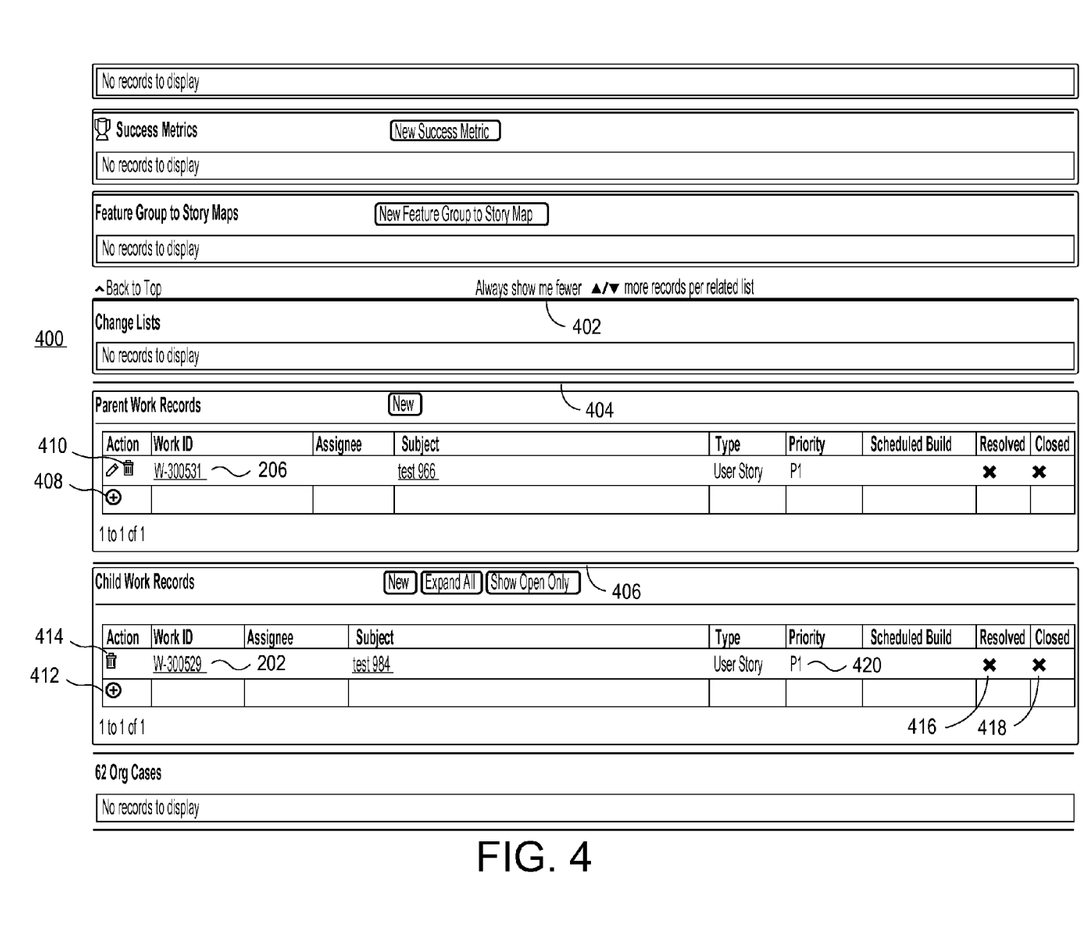
FIG. 4 illustrates an example page that includes multiple sections for displaying relationships among work records, according to one embodiment.

FIG. 4 illustrates an example page 400 that includes multiple sections for displaying relationships among work records, according to one embodiment. In one embodiment, the sections include a change list section 402, a parent work records section 404, and a child work records section 406. In one embodiment, change list section 402 may include a list of work records, such as those listed in FIG. 2, before being designated as a parent work record or a child work record.

In one embodiment, after system 116 receives an indication that designates a particular work record as a parent work record, system 116 lists the work record in the parent work records section 404. For example, as FIG. 4 shows, work record 206 (shown as W-300531) is designated as a parent work record.

In one embodiment, the user entering a particular work record in the parent work records section 404 designates that work record as a parent work record. In one embodiment, to designate a given work record as a parent, the user may click on an add button 408 (e.g., plus symbol) in parent work records section 404 and then enter data (e.g., W-300531) that identifies a particular work record. In one embodiment, to undesignate a given work record as a parent, the user may click on a remove button 410 (e.g., trash symbol) adjacent to the work record in parent work records section 404.

In one embodiment, after system 116 receives an indication that designates a particular work record as a child work record, system 116 lists the work record in the child work records section 406. For example, as FIG. 4 shows, work record 202 (e.g., W-300529) is designated as a child work record.

In one embodiment, the user entering a particular work record in the child work records section 406 designates that work record as a child work record. In one embodiment, to designate a given work record as a child, the user may click on an add button 412 (e.g., plus symbol) in child work records section 406, and then enter data (e.g., W-300529) that identifies a particular work record. In one embodiment, to undesignate a given work record as a child, the user may click on a remove button 414 (e.g., trash symbol) adjacent to the work record in child work records section 406. Other methods for designating particular work records as parents or children are possible.

For ease of illustration, a parent-child relationship between only two work records is shown in FIG. 4. System 116 may allow a user to designate multiple parent-child relationships among multiple work records in order to organize a given group of work records into a family of work records having a particular hierarchy.

In one embodiment, a given parent work record for a particular bug fix may have associated child work records for one or more respective work records for one or more bug fixes. Such a scenario may arise when a bug fix results in one or more new bugs.

In one embodiment, a given parent work record for a particular user story may have associated child work records for one or more respective work records for one or more user stories. Such a scenario may arise when a user story gives a user (e.g., developer, manager, etc.) one or more ideas for additional user stories.

In one embodiment, system 116 allows a given work record family to include different types of work records. For example, as described in more detail below, a parent work record may be for a user story, and a related child work record may be for a bug fix, and vice versa. In one embodiment, a work record family may be defined as two or more work records having parent-child relationships with each other. In one embodiment, a work record family extends to descendants (e.g., grandchildren) and ancestors (e.g., grandparents).

In one embodiment, a work record for a bug fix may be the parent of one or more work records for user stories. Such a scenario may arise when one or more particular user stories arise in association with a particular bug fix. For example, a bug fix may give a user or developer one or more ideas for user stories in order to make one or more improvements to the software application.

In one embodiment, a work record for a user story may be the parent of one or more work records for bug fixes. Such a scenario may arise when one or more particular bugs arise in association with a user story.

In one embodiment, a given work record may have multiple states. For example, system 116 may deem the record to be open when the work record is created and the request for the work record (e.g., for a user story or bug fix) has not yet been fulfilled. After the request is fulfilled (e.g., user story or bug fix completed/resolved), system 116 may deem the work record to be closed. In one embodiment, system 116 may display a resolved indication 416 and a closed indication 418, as shown in FIG. 4.

In one embodiment, each work record may have a priority designation 420. Labels such as P0, P1, P2, P3, etc., may distinguish among different priorities. In one embodiment, P0 may indicate the highest priority (e.g., most critical) that needs to be addressed immediately. P1 designations may be critical, yet can be addressed later (e.g., a day later). P2 designations may be less critical, etc.

In one embodiment, work records associated with bug fixes may often have a higher priority (e.g., P0) compared to user stories (e.g., P2), depending on the particular circumstances. In one embodiment, parent-child relationships between any two or more work records are independent of priorities associated with each of the two or more work records. In one embodiment, priorities may be discretionary and determined by an appropriate user (e.g., developer, manager, etc.). In one embodiment, a parent-child relationship between two or more given work records may correspond to priorities associated with each of the two or more given work records. For example, in one example scenario, a parent may have a higher priority than its child.

Figure 5:
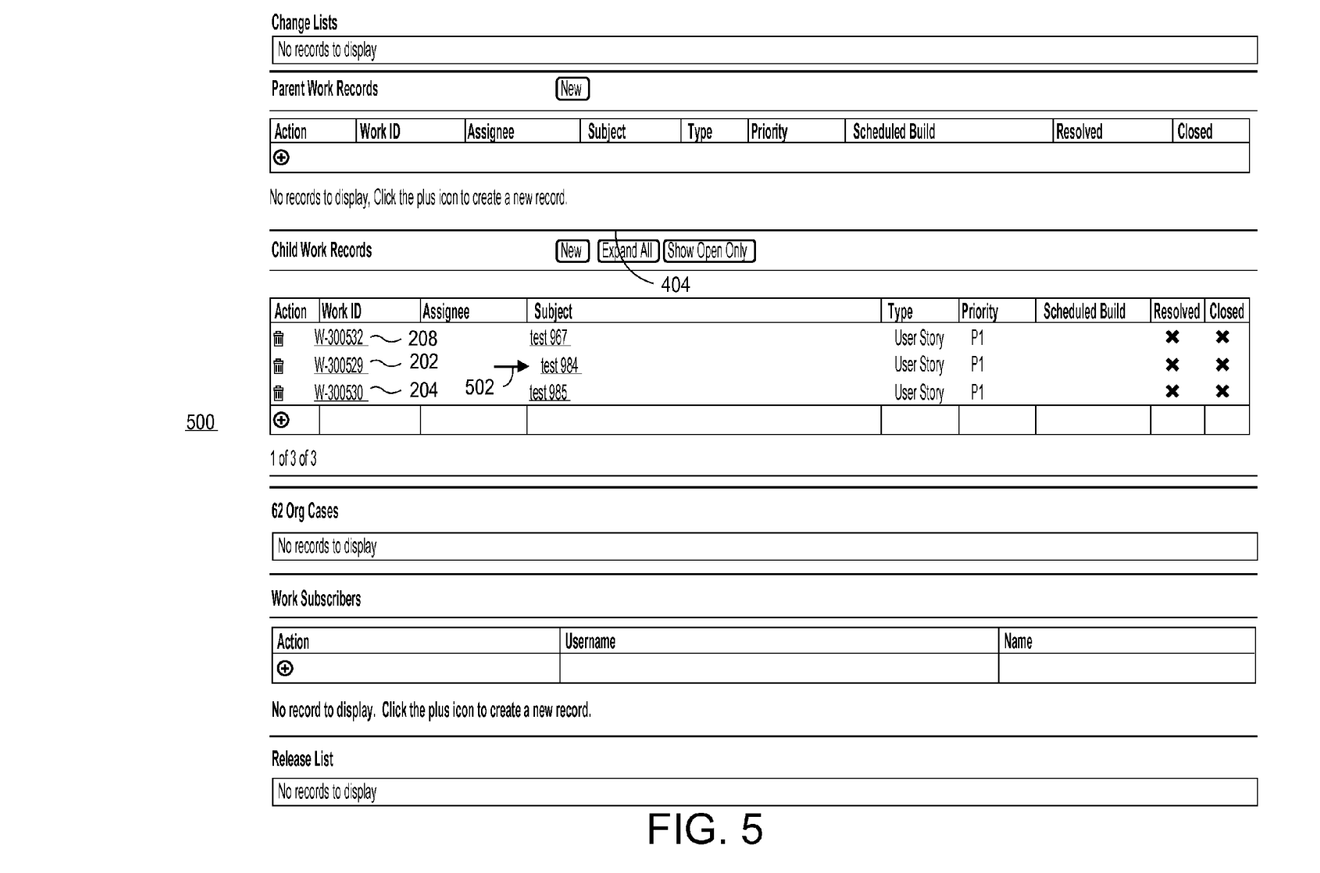
FIG. 5 illustrates another example page that includes multiple sections for displaying relationships among work records, according to one embodiment.

FIG. 5 illustrates an example page 500 that includes multiple sections for displaying relationships among work records, according to one embodiment. In one embodiment, referring to parent work records section 404, system 116 may use indents (e.g., indent 502) in order to display relationships among work records. For example, as FIG. 5 shows, indent 502 indicates that work record 202 (W-300529) is a child of work record 208 (W-300532). In this particular example, work records 208 (W-300532) and 204 (W-300530) are siblings.

In one embodiment, system 116 ensures proper relationships among work records according to one or more policies. For example, in one embodiment, system 116 may prevent a given work record from being both a parent and a child of the same work record (e.g., no circular dependencies). In one embodiment, system 116 may indicate an error if a given policy is violated.

In one embodiment, work records may be associated for a variety of reasons. For example, work records may be related because they may be associated with related user stories and/or associated with related bug fixes.

In one embodiment, a parent work record of one type can have a child work record of another type. For example, a particular bug may result from changes associated with a user story. In this example, the user story work record may be the parent of the bug fix work record. In another example, a particular idea for new functionality can result from fixing a bug. In this example, the bug fix record may be the parent of the bug fix record.

In one embodiment, system 116 provides a number of different views that allow users to view a developer's work. In one embodiment, system 116 may display various tabs to the user. In one embodiment, a number of other views can be designated, where one such view may enable a user to create parent-child relationships among work records, as described herein.

Embodiments described herein provide numerous benefits. For example, a user may organize a group of work records based on their relationship to each other. A user may designate work records as parent or child work records after they are created and may undesignate or change designations at a future time.

FIG. 6 illustrates a block diagram of an example environment 610 where a database service might be used, and which may be used to implement the embodiments described herein. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616. System 616 may also be referred to as a cloud service provider. System 616 provides its resources to customers (e.g., end users) as a service.

An on-demand database service, such as system 616, is a database system that is made available to outside users who do not need to necessarily be concerned with building and/or maintaining the database system, but instead may be available for more general use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, system 616 may include an application platform 618 that enables creating, managing, and executing one or more applications developed for an on-demand database service, for users accessing the on-demand database service via user systems 612, or for third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global internetwork of networks often referred to as the "Internet" with a capital "I." That network will be used in many of the examples herein. However, it should be understood that the networks used with the embodiment described herein use are not so limited, although TCP/IP is a frequently implemented protocol.

User systems 612 might communicate with system 616 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as to provide related data, code, forms, webpages and other information to and from user systems 612. The application servers are also configured to store to, and retrieve from, a database system related data, objects, and Webpage content. With a multi-tenant system, data for multiple tenants may be stored in the same physical database object. Tenant data may be arranged such that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party application developer) software applications, which may or may not include CRM, may be supported by the application platform 618, which manages the creation and storage of the applications into one or more database objects, and executing of the applications in a virtual machine in the process space of the system 616. The terms "application," "software application," "software package," "software code," and "program code" are used interchangeably.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 illustrates a block diagram of another example environment 610, which may be used to implement the embodiments described herein. FIG. 7 also illustrates elements of system 616 and various interconnections, according to one embodiment. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, user interface (UI) 730, application program interface (API) 732, PL/Salesforce.com object query language (PL/SOQL) 734, save routines 736, application setup mechanism 738, applications servers 7001-700N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown in FIG. 6, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes and to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710, for example. Invocations to such applications may be coded using PL/SOQL 734 that provides a programming language style interface extension to API 732. Invocations to applications may be detected by one or more system processes, which manage retrieving application metadata 716 for the subscriber, making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer control protocol and Internet protocol (TCP/IP) are typical protocols for communicating between application servers 700 and the database system. However, it will be apparent to one skilled in the art that other transport protocols may be used to optimize the system depending on the network connection used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles the storage of, and access to, different objects, data and applications across disparate users and organizations.

As an example of storage, one tenant might be a company that employs a sales force where each salesperson uses system 616 to manage his or her sales process. Thus, a user might maintain contact data, leads data, customer follow-up data, performance data, goals and progress data, etc., all applicable to that user's personal sales process (e.g., in tenant data storage 622). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more structured query language (SQL) statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the embodiments described herein. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for tracking work in a database environment, the method comprising:

providing, by an on-demand database services system, a software application implemented on a cloud platform of the on-demand database services system to different users accessing the on-demand database services system via different user systems via a network;

generating, by the on-demand database services system, a plurality of work records in data storage of the on-demand database services system, wherein each work record has a unique identification label and is associated with code for new functionality or a bug fix that is written by a respective user of the different users and submitted via a respective user system of the different user systems for integration into the software application to provide one or more changes to the software application implemented on the cloud platform of the on-demand database services system;

receiving, by the on-demand database services system, a first indication from a first user of the different users that designates a first work record of the plurality of work records as a parent work record; and receiving, by the on-demand database services system, a second indication from the first user that designates a second work record of the plurality of work records as a child work record, wherein the second work record is a child of the first work record.

2. The method of claim 1, further comprising displaying a parent-child relationship between the first work record and the second work record.

3. The method of claim 1, further comprising displaying a parent work records section and a child work records section, wherein at least the first work record is listed in the parent work records section after the first work record is designated as a parent work record, and wherein at least the second work record is listed in the child work records section after the second work record is designated as a child work record.

4. The method of claim 1, wherein generating the plurality of work records comprises generating, by the on-demand database services system, the unique identification label for each work record of the plurality of work records.

5. The method of claim 1, further comprising displaying an indication of the state of a given work record of the plurality of work records.

6. The method of claim 1, further comprising preventing, by the on-demand database services system, circular dependencies among the plurality of work records.

7. The method of claim 1, wherein the first user comprises a person assigned to the code.

8. The method of claim 1, wherein the code is input by the first user via a first user system of the different user systems.

9. A computer-readable storage medium carrying one or more sequences of instructions thereon for tracking work in a database environment, the instructions when executed by a processor cause the processor to:

provide a software application implemented on a cloud platform to different users accessing the cloud platform via different user systems via a network;

generate a plurality of work records in data storage, wherein each work record has a unique identification label and is associated with code for new functionality or a bug fix that is written by a respective user of the different users and submitted via a respective user system of the different user systems for integration into the software application to provide one or more changes to the software application implemented on the cloud platform;

receive a first indication from a first user of the different users that designates a first work record of the plurality of work records as a parent work record; and receive a second indication from the first user that designates a second work record of the plurality of work records as a child work record, wherein the second work record is a child of the first work record.

10. The computer-readable storage medium of claim 9, wherein the first work record and the second work record are different work record types.

11. The computer-readable storage medium of claim 9, wherein the first work record is associated with a user story or a bug fix.

12. The computer-readable storage medium of claim 9, wherein the second work record is associated with a user story or a bug fix.

13. The computer-readable storage medium of claim 9, wherein the instructions further cause the processor to display a parent-child relationship between the first work record and the second work record.

14. The computer-readable storage medium of claim 9, wherein the instructions further cause the processor to display a parent work records section and a child work records section, wherein at least the first work record is listed in the parent work records section after the first work record is designated as a parent work record, and wherein at least the second work record is listed in the child work records section after the second work record is designated as a child work record.

15. An apparatus for tracking work in a database environment, the apparatus comprising:

a processor; and a storage device storing one or more stored sequences of instructions which when executed by the processor cause the processor to:

provide a software application implemented on a cloud platform to different users accessing the cloud platform via different user systems via a network;

generate a plurality of work records in data storage, wherein each work record has a unique identification label and is associated with code for new functionality or a bug fix that is written by a respective user of the different users and submitted via a respective user system of the different user systems for integration into the software application to provide one or more changes to the software application implemented on the cloud platform;

receive a first indication from a first user of the different users that designates a first work record of the plurality of work records as a parent work record; and receive a second indication from the first user that designates a second work record of the plurality of work records as a child work record, wherein the second work record is a child of the first work record.

16. The apparatus of claim 15, wherein the first work record and the second work record are different work record types.

17. The apparatus of claim 15, wherein the first work record is associated with a user story or a bug fix.

18. The apparatus of claim 15, wherein the second work record is associated with a user story or a bug fix.

* * * * *